United States Patent
Pullagurla et al.

(10) Patent No.: US 12,331,066 B2
(45) Date of Patent: Jun. 17, 2025

(54) PROCESS FOR THE PREPARATION OF SUCROFERRIC OXYHYDROXIDE

(71) Applicant: BIOPHORE INDIA PHARMACEUTICALS PVT. LTD, Hyderabad (IN)

(72) Inventors: Manik Reddy Pullagurla, Hyderabad (IN); Bhaskar Reddy Pitta, Hyderabad (IN); Rajesh Bhudeti, Hyderabad (IN); Jagadeesh Babu Rangisetty, Hyderabad (IN)

(73) Assignee: BIOPHORE INDIA PHARMACEUTICALS PVT. LTD, Hyderabad (IN)

(*) Notice: Subject to any disclaimer, the term of this patent is extended or adjusted under 35 U.S.C. 154(b) by 870 days.

(21) Appl. No.: 17/430,098

(22) PCT Filed: Feb. 12, 2020

(86) PCT No.: PCT/IB2020/051117
§ 371 (c)(1),
(2) Date: Aug. 11, 2021

(87) PCT Pub. No.: WO2020/165781
PCT Pub. Date: Aug. 20, 2020

(65) Prior Publication Data
US 2022/0144873 A1     May 12, 2022

(30) Foreign Application Priority Data
Feb. 12, 2019  (IN) .............................. 201941005485

(51) Int. Cl.
C07F 15/02     (2006.01)
B01D 11/04     (2006.01)

(52) U.S. Cl.
CPC ........ *C07F 15/025* (2013.01); *B01D 11/0492* (2013.01)

(58) Field of Classification Search
CPC ................ C07F 15/025; B01D 11/0492; B01J 20/0229; B01J 20/223
See application file for complete search history.

(56) References Cited

U.S. PATENT DOCUMENTS

| | | | |
|---|---|---|---|
| 6,174,442 B1 | 1/2001 | Geisser et al. | |
| 7,964,568 B2 | 6/2011 | Beck et al. | |
| 10,624,855 B2* | 4/2020 | Chofflon | ................... A61P 3/00 |
| 2017/0259241 A1 | 9/2017 | Kumar et al. | |

FOREIGN PATENT DOCUMENTS

| | | | | |
|---|---|---|---|---|
| WO | 9722266 A1 | 6/1997 | | |
| WO | WO-2016038541 A1 * | 3/2016 | ........... | A61K 31/295 |
| WO | WO-2016098131 A2 * | 6/2016 | ............. | A23L 33/16 |

OTHER PUBLICATIONS

Geetha, K., et al. Carbohydrate Research. 271, (1995), 163-175. (Year: 1995).*
Fish, D. H., & Dietz, J. M. 2009. Final Report for OSM PA (AMD-04) Grant. Submitted to the Pennsylvania Department of Environmental Protection, Harrisburg, PA. USA (Year: 2009).*
International Search Report for PCT Serial No. PCT/IB2020/051117 dated Jun. 11, 2020.

* cited by examiner

*Primary Examiner* — Eric Olson
*Assistant Examiner* — Samuel L Galster
(74) *Attorney, Agent, or Firm* — McCormick, Paulding & Huber PLLC

(57) ABSTRACT

The present invention relates to an improved process for the preparation of pharmaceutical grade of Sucroferric oxyhydroxide (1). More particularly, the present invention relates to a process for the preparation of Sucroferric oxyhydroxide (1) specific surface area of more than 16 $m^2/gm$ and having phosphate binding capacity by Ion Chromatography (IC) is at least 2.6 meq. of phosphate per 500 mg Iron and at least 0.2 mg P/mg of Iron.

1 Claim, 3 Drawing Sheets

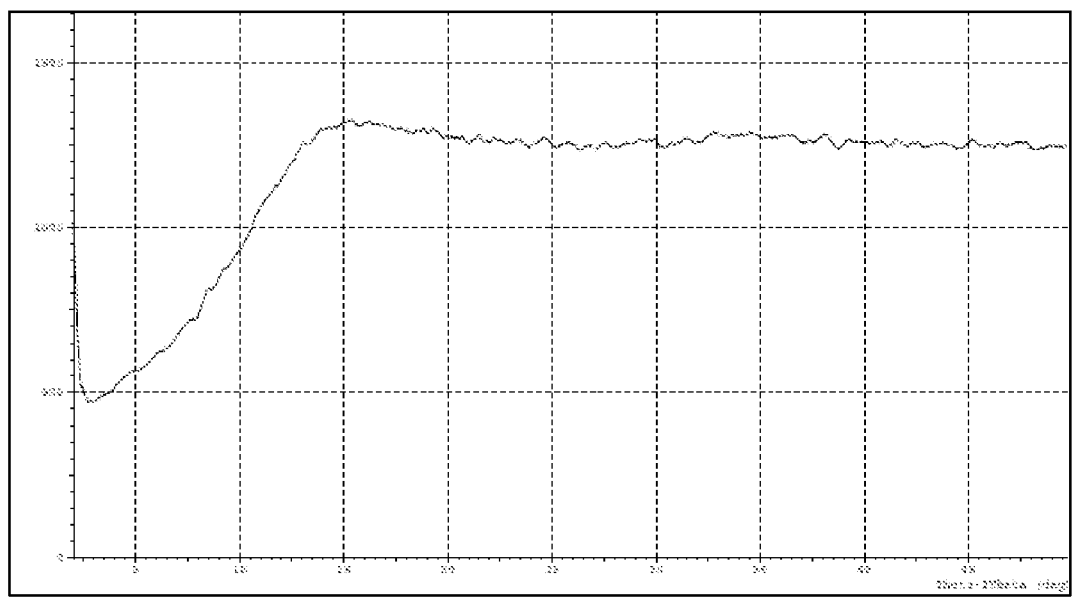
Figure 1: illustrates the X-Ray powder diffraction pattern (XRPD) of Sucroferric oxyhydroxide (1).

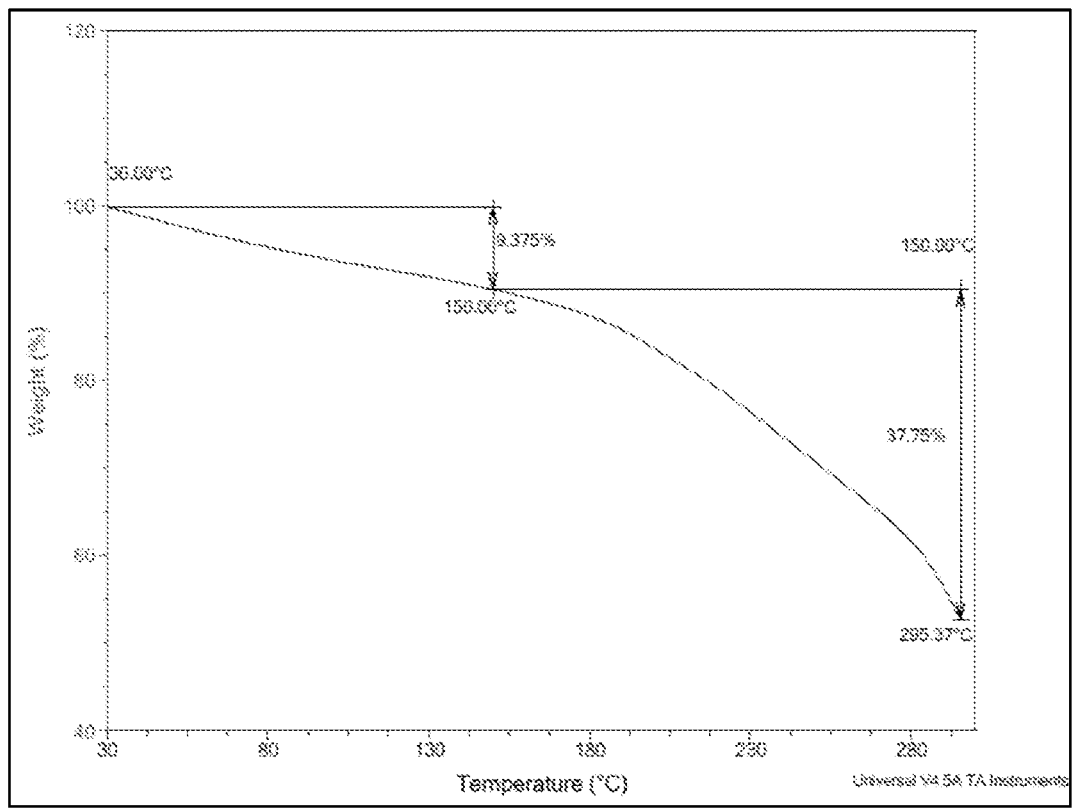
Figure 2: illustrates the Thermogravimetric analysis (TGA) endothermic peak of Sucroferric oxyhydroxide (1).

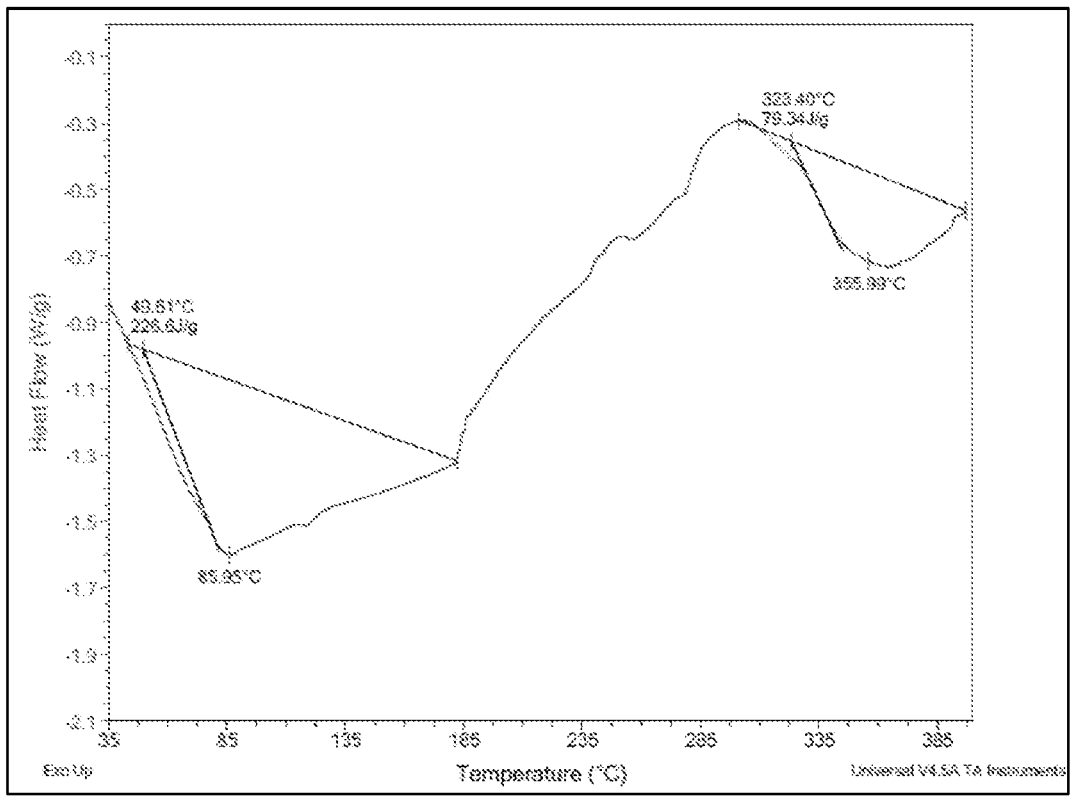
Figure 3: illustrates the Differential scanning calorimetry (DSC) of Sucroferric oxyhydroxide (1).

PROCESS FOR THE PREPARATION OF SUCROFERRIC OXYHYDROXIDE

CROSS REFERENCE TO RELATED APPLICATIONS

This application is a National Stage application of International Patent Application No. PCT/IB2020/051117, filed on Feb. 12, 2020, which claims the priority from Indian Patent Application No. 201941005485 filed Indian Patent Office on Feb. 12, 2019, each of which is hereby incorporated by reference in its entirety.

TECHNICAL FIELD

The present invention relates to an improved, commercially viable and cost-effective process for the preparation of Sucroferric oxyhydroxide (1). More particularly, the present invention relates to a process for the preparation of Sucroferric oxyhydroxide (1) with specific surface area of more than 16 $m^2$/gm.

BACKGROUND

Sucroferric oxyhydroxide is non-calcium, iron-based a phosphate binder used to control serum phosphorus levels in patients with chronic kidney disease on hemodialysis or peritoneal dialysis. It was approved by the USFDA on Nov. 27, 2013 and is marketed as Velphoro in the form of chewable tablets.

U.S. Pat. No. 6,174,442 patent discloses preparation of beta-iron hydroxide stabilized by carbohydrates and humic acid.

U.S. Pat. No. 7,964,568 patent discloses the synthesis of high molecular weight iron-saccharidic complexes, which could be isolated by precipitation, dialysis or column fractionation and spray drying or lyophilization methods.

US 2017259241 application discloses the preparation of Sucroferric oxyhydroxide, which uses decantation method for the isolation of intermediate ferric oxyhydroxide and removal of excess chloride, which is difficult at industrial level. Also use of water miscible solvents during isolation of final Sucroferric oxyhydroxide may result in inconsistent sucrose quantity in the final active pharmaceutical ingredient.

In most of the prior art processes involves the synthesis of iron sucrose complexes with additional by-products and are contaminated with ferric salt formed, which makes the iron level in the final product inconsistent. Also, the prior art processes use freeze drying, lyophilization techniques, which are too expensive on large scale and decantation for isolation is not feasible at industrial level.

The present invention therefore aims at providing a simple, improved cost-effective process for preparation of Sucroferric oxyhydroxide (1) with controlled molecular weight which is scalable using simple and cost-effective process.

Accordingly, in one objective of the invention is to provide an improved process for the preparation of Sucroferric oxyhydroxide (1).

In another objective of the invention is to provide a process for the isolation of intermediate ferric oxyhydroxide (2) using simple filtration techniques, which is cost effective and advantageous over prior art methods.

In another objective of the present invention is to provide a process for the isolation of Sucroferric oxyhydroxide (1) using water immiscible solvents without any further purification, which is advantageous in maintaining the sucrose content which in turn helps to confirm the molecular weight as specified by the regulatory authorities.

Yet, another objective of the present invention is to provide an improved process for the preparation Sucroferric oxyhydroxide (1) having specific surface area more than 16 $m^2$/gm and 90.0% of the particle volume more than 100 µm.

SUMMARY

Accordingly, in one objective of the invention is to provide an improved process for the preparation of pharmaceutical grade Sucroferric oxyhydroxide (1), which can be used as an adsorbent for inorganic phosphates or phosphates bound to foodstuffs.

In another objective of the invention is to provides an improved process for the preparation of Sucroferric oxyhydroxide (1) comprising the following steps as depicted in scheme 1:
  a) mixing an aqueous solution of ferric chloride hexahydrate (3) and an aqueous solution of base or mixture of bases to form ferric oxyhydroxide (2) to maintain pH 6.0 to 7.5;
  b) isolating and washing the solid ferric oxyhydroxide (2) with water;
  c) adding a suitable protic solvent to ferric oxyhydroxide (2) at 25-30° C.;
  d) adding suitable carbohydrates or mixture of carbohydrates to the reaction mixture at 25-30° C.;
  e) removing the solvent by a suitable technique; and
  f) isolating Sucroferric oxyhydroxide (1) using water immiscible solvents.

Yet, another objective of the present invention us to provide Sucroferric oxyhydroxide (1) having 90.0% of the particle volume more than 100 µm.

Still yet, another objective of the present invention is to provide Sucroferric oxyhydroxide (1) with specific surface area more than 16 $m^2$/gm.

BRIEF DESCRIPTION OF DRAWINGS

FIG. 1: illustrates the X-Ray powder diffraction pattern (XRPD) of Sucroferric oxyhydroxide (1).

FIG. 2: illustrates the Thermogravimetric analysis (TGA) endothermic peak of Sucroferric oxyhydroxide (1).

FIG. 3: illustrates the Differential scanning calorimetry (DSC) of Sucroferric oxyhydroxide (1).

DETAILED DESCRIPTION

Accordingly, the present invention relates to an improved process for the preparation of Sucroferric oxyhydroxide (1) as illustrated in scheme 1, below:

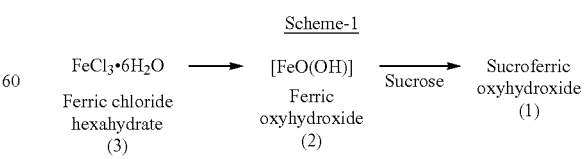

Scheme-1

In another embodiment, the present invention provides an improved process for the preparation of Sucroferric oxyhydroxide (1) comprising:

a) mixing an aqueous solution of ferric chloride hexahydrate (3) and an aqueous solution of base or mixture of bases to form ferric oxyhydroxide (2) to maintain pH 6.0 to 7.5;
b) isolating and optionally washing ferric oxyhydroxide (2) with water;
c) adding a suitable protic solvent to ferric oxyhydroxide (2) at 25-30° C.;
d) adding suitable carbohydrates or mixture of carbohydrates to the reaction mixture at 25-30° C.;
e) removing the solvent by a suitable technique; and
f) isolating Sucroferric oxyhydroxide (1) using water immiscible solvents and drying at suitable temperature.

According to the present invention, the base used in step a) may be selected from a group comprising of a strong base's like hydroxides or a carbonate of an alkali or alkaline earth metal, which may be selected from sodium bicarbonate, potassium bicarbonate, lithium bicarbonate, sodium hydroxide, potassium hydroxide, or mixtures thereof. Preferably strong base used in step a) is sodium hydroxide in combination with sodium bicarbonate were used in the present invention. All the process steps from step a) to step f) except drying have been conducted at 25-30° C.

The present invention uses mixtures of bases in the preparation of Sucroferric oxyhydroxide (1), which helps to maintain the pH of the reaction mixture and also useful to avoid the formation of byproducts. The pH of the reaction mixture in step a) is maintained at 6 to 7.5.

In one embodiment, the excess chloride formed is removed in step b) by washing with micron filtered water till the chloride content is less than 1000 ppm.

The suitable protic solvent used in step c) may be selected from a group comprising of methanol, ethanol, isopropyl alcohol, n-propanol, n-butanol, water or the like, preferably isopropyl alcohol was used in the present invention.

In another embodiment the carbohydrate used in step d) may be a soluble carbohydrate. comprising glucose, sucrose and fructose; preferably, the soluble carbohydrate is sucrose.

In another embodiment the carbohydrate used in step d) may be an insoluble carbohydrate, which is selected from corn starch, wheat starch, rice starch, maize starch, potato starch, or mixture thereof. Preferably starch is a mixture of potato starch and maize starch.

In another embodiment, step d) involves the addition of predetermined amount of suitable carbohydrates required for the formation of Sucroferric oxyhydroxide (1) were added to the reaction mixture and stirred for 30-40 minutes. The resulting mixture was distilled off under vacuum to remove the solvent. In some embodiment, solvent used in step e) may be removed by distillation.

In some embodiment, isolation of Sucroferric oxyhydroxide (1) in step f) may be done using water immiscible solvents, which comprise of but not limited to dichloromethane, ethyl acetate, diethyl ether, methyl tert-butyl ether, toulene, hexane, cyclohexane, heptane, carbon tetrachloride or the like; preferably cyclohexane was used in the present invention.

In some embodiment, the said process for the preparation and isolation of Sucroferric oxyhydroxide (1) may be carried out using simple reaction conditions comprising of maintaining the reaction temperature at 25-60° C., more preferably 25-30° C. till the completion of the reaction, which is highly preferable in industrial scale.

The particularly the present invention provides an improved process for the preparation of Sucroferric oxyhydroxide (1) comprising:

a) mixing an aqueous solution of ferric chloride hexahydrate (3) and an aqueous solution of sodium hydroxide and sodium carbonate to form ferric oxyhydroxide (2) to maintain pH 6.0 to 7.5;
b) isolating the solid and washing ferric oxyhydroxide (2) with micron filtered water;
c) adding isopropyl alcohol to the solid ferric oxyhydroxide (2) at 25-30° C.;
d) adding sucrose, potato starch and maize to the reaction mixture at 25-30° C.;
e) removing isopropyl alcohol by a distillation; and
f) isolating Sucroferric oxyhydroxide (1) using cyclohexane and drying below 50° C.

Accordingly, Sucroferric oxyhydroxide (1) obtained in the present invention does not need any further purification and complies with all required specification of chloride content, iron content, phosphate binding test, sucrose content, starch content and maize starch content. Also, the particle size of Sucroferric oxyhydroxide (1) is controlled based on the requirement.

In another embodiment, the ferrous ion content of Sucroferric oxyhydroxide (1) obtained by the present invention is less than 0.50 (% w/w), more preferably less than 0.3 (% w/w)., still more preferably less than 0.2 (% w/w).

In another embodiment, the chloride content of Sucroferric oxyhydroxide (1) obtained in the present invention is less than 0.50 (% w/w), more preferably less than 0.30 (% w/w), still more preferably less than 0.1 (% w/w) as measured by Potentiometry analysis.

In another embodiment, the heavy metal content of Sucroferric oxyhydroxide (1) obtained in the present invention was less than 10 ppm.

In another embodiment, the starch content of Sucroferric oxyhydroxide (1) obtained in the present invention is having in the range of 34.0 (% w/w) to 26.0 (% w/w) as measured by high performance liquid chromatography (HPLC).

In another embodiment, the sucrose content of Sucroferric oxyhydroxide (1) obtained in the present invention is having in the range of 32.0 (% w/w) to 26.0 (% w/w) as determined by high performance liquid chromatography (HPLC).

In some embodiment, particle size of Sucroferric oxyhydroxide (1) can be controlled by subjecting to a suitable size reduction technique comprising of but not limiting to ball, roller or hammer milling; or jet milling; or bead milling.

In some embodiment, the present invention provides Sucroferric oxyhydroxide (1) having 90% of the particle volume more than 100 μm.

In some embodiment, specific surface area of Sucroferric oxyhydroxide (1) obtained in the present invention is more than 16 m$^2$/gm.

In some embodiment the Sucroferric oxyhydroxide (1) obtained in the present invention is characterized by X-Ray powder diffraction is as shown in FIG. 1, Thermogravimetric analysis (TGA) endothermic peak at 295.37° C. and as illustrated FIG. 2 and by Differential scanning calorimetry (DSC) as illustrated in FIG. 3.

Instrument Details:
Iron Fe (II) content by UV-Visible spectrophotometry analysis (w/w):
Instrumentation: UV-Visible spectrophotometer, conditions: Wavelength: 510 nm, Cycle time: 1S, Response: 2S, Ordinate Type: A, Slit Width: 1 mm UV lamp: ON, Visible lamp: ON.

Sucrose Content Analysis:
Chemicals and reagents: Milli Q water, Acetonitrile HPLC grade, Sucrose standard, Chromatographic conditions: Instrument: A High-performance chromatography equipped with refractive index detector and an auto sampler, Column: Sperisorb $NH_2$, 250×40 mm, Detector: Refractive index detector, Detector temperature: 30° C., Flow rate: 2 ml/min, Flow mode: Isocratic, Injection volume: 20 MicroL, Column temp: Ambient, Sample temperature: 5° C., Run time: 20 min, Diluent: water.

Phosphate Binding Capacity by Ion Chromatography:
Chromatographic conditions: Instrument: An Ion chromatography equipped with gradient elution and conductivity detector, Column: Dionex Ion pac AS11HC4× 250 mm, suppressor: AERS 500 (4 mm) suppressor, Current: 104 mA, Flow rate: 1.2 ml/min, Detector: conductivity, column temperature: 35° C., Injection volume: 5 microL, Run time: 15 minutes.

The following examples further illustrate the present invention but should not be construed in any way as to limit its scope.

EXAMPLES

Example 1: Preparation of Ferric Oxyhydroxide (2)

6.0 g of sodium hydroxide and 62.0 g of sodium carbonate were added to 1000 mL water at 25-30° C. This solution was added to an aqueous solution of 100.0 g of ferric chloride hexahydrate (3) dissolved in 1000 mL of water. The pH of the reaction mass was maintained between 6 to 7.5 using 5% micron filtered sodium hydroxide solution. The solid formed was filtered and washed with water and the pH of the reaction mass was maintained between 7 to 7.5 and filtered to obtain Ferric oxyhydroxide (2), which was directly used in the next step.

Example 2: Preparation of Sucroferric Oxyhydroxide (1)

The solid Ferric oxyhydroxide (2) so obtained in example-1 was added to a solution of 300 mL of isopropyl alcohol at 25-30° C. 31.0 g of sucrose, 20.0 g of potato starch and 9.0 g of maize starch were added to the ferric oxyhydroxide (2) solution for 30-45 minutes at 25-30° C. The solvent was removed by distillation under vacuum below 55° C. The crude so obtained was washed with a mixture of micron filtered isopropyl alcohol and cyclohexane. The reaction mass was then cooled to 25-30° C. and stirred for 60-90 min to obtain solid Sucroferric oxyhydroxide (1). Yield: 85%

Example 3: Isolation of Sucroferric Oxyhydroxide (1)

The solid Sucroferric oxyhydroxide (1) obtained in example 2, was added to 300 mL of cyclohexane at 25-30° C. and stirred for 60-90 min. The reaction mass was then filtered under vacuum. The solid so obtained was further washed with 100 mL cyclohexane, filtered and dried under vacuum below 50° C. The solid so obtained was micronized to obtain Sucroferric oxyhydroxide (1). Yield: 95%, chloride content by potentiometry (% w/w): 0.03; phosphate binding capacity IC: 3.7 meq $PO_4$ per 500 mg Fe; 0.20 mg P per mg Fe.

Example-4: Preparation of Sucroferric Oxyhydroxide (1)

6.0 g of sodium hydroxide and 62.0 g of sodium carbonate were added to 1000 mL water at 25-30° C. This solution was added to an aqueous solution of 100.0 g of ferric chloride hexahydrate (3) dissolved in 1000 mL of water. The pH of the reaction mass was maintained between 6 to 7.5 by aqueous sodium hydroxide solution. The obtained solid was filtered and washed with water. The obtained solid Ferric oxyhydroxide (2) was added to a solution of 300 mL of isopropyl alcohol at 25-30° C. 31.0 g of sucrose, 20.0 g of potato starch and 9.0 g of maize starch were added to the ferric oxyhydroxide (2) solution for 30-45 minutes at 25-30° C. The solvent was removed by distillation under vacuum. The crude so obtained was washed with a mixture of micron filtered isopropyl alcohol and cyclohexane. The reaction mass was then cooled to 25-30° C. and stirred for 60-90 min to obtain solid Sucroferric oxyhydroxide (1). The obtained solid was added to 300 mL of cyclohexane at 25-30° C. and stirred for 60-90 min. The reaction mass was then filtered under vacuum. The solid so obtained was further washed with 100 mL cyclohexane, filtered and dried under vacuum below 50° C. The brown amorphous solid so obtained was micronized to obtain Sucroferric oxyhydroxide (1). Yield: 95%.

Chloride content by potentiometry (% w/w): 0.03;
Phosphate binding capacity IC: 3.7 meq $PO_4$ per 500 mg Fe; 0.20 mg P per mg Fe.
Iron content Fe (II) by UV-Visible spectrophotometry (% w/w): 0.19
Starch content: 27.7 (% w/w)
Sucrose content: 29.3 (% w/w)

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:
1. A process for the preparation of pharmaceutical grade sucroferric oxyhydroxide (1), comprising:
   a) mixing aqueous ferric chloride hexahydrate (3) and an aqueous solution of a mixture of sodium hydroxide and sodium carbonate to form ferric oxyhydroxide (2) to maintain pH at 6.0 to 7.5 using 5% micron filtered sodium hydroxide solution;
   b) isolating ferric oxyhydroxide (2) and washing the solid ferric oxyhydroxide (2) with water;
   c) adding isopropyl alcohol to the solid ferric oxyhydroxide (2) at 25-30° C.;
   d) adding sucrose, potato starch and maize starch to the reaction mixture at 25-30° C.; and
   e) isolating sucroferric oxyhydroxide (1) using cyclohexane.

* * * * *